(12) United States Patent (10) Patent No.: US 7,886,581 B2
Kozuchi et al. (45) Date of Patent: Feb. 15, 2011

(54) OIL-BASED INK COMPOSITION FOR INK JET RECORDING AND METHOD FOR INSPECTING IT

(75) Inventors: Takashi Kozuchi, Suwa (JP); Kazuhiko Hara, Suwa (JP); Yukio Sugita, Yokohama (JP); Mitsuyoshi Tamura, Yokohama (JP); Fumie Yamazaki, Yokohama (JP); Mitsuteru Yamada, Yokohama (JP)

(73) Assignees: Seiko Epson Corporation, Tokyo (JP); The Inctec Inc., Kanagawa (JP)

( * ) Notice: Subject to any disclaimer, the term of this patent is extended or adjusted under 35 U.S.C. 154(b) by 604 days.

(21) Appl. No.: 11/873,340

(22) Filed: Oct. 16, 2007

(65) Prior Publication Data

US 2009/0030121 A1 Jan. 29, 2009

(30) Foreign Application Priority Data

Oct. 17, 2006 (JP) ............................. 2006-282329

(51) Int. Cl.
*G01N 30/02* (2006.01)
*C09D 11/00* (2006.01)

(52) U.S. Cl. ...................... 73/61.55; 524/90; 106/31.78; 523/160

(58) Field of Classification Search .................... 524/90; 106/31.78; 73/61.55
See application file for complete search history.

(56) References Cited

U.S. PATENT DOCUMENTS 7,125,447 B2 10/2006 Sugita et al.
7,156,909 B2 1/2007 Oyanagi et al.
7,585,364 B2 9/2009 Deroover
7,648,571 B2 1/2010 Deroover
2004/0266907 A1 12/2004 Sugita et al.
2007/0167538 A1 7/2007 Mochizuki et al.

FOREIGN PATENT DOCUMENTS

| EP | 1367101 A1 | 12/2003 |
|---|---|---|
| EP | 1801171 A1 | 12/2006 |
| EP | 1790695 A1 | 5/2007 |
| JP | 2003-268265 | 9/2003 |

OTHER PUBLICATIONS

European search report for corresponding European application 07020203.1, Feb. 4, 2008.

*Primary Examiner*—David Wu
*Assistant Examiner*—Vu A Nguyen
(74) *Attorney, Agent, or Firm*—DLA Piper LLP (US)

(57) ABSTRACT

The invention provides an oil-based ink composition for ink jet recording, which is best suited for printing onto polyvinyl chloride substrates, and improved in terms of both the stabilities of ink on storage and jetting, and a method for inspecting the same. The oil-based ink composition for ink jet recording comprises as a main solvent at least a specific polyalkylene glycol dialkyl ether and containing at least a specific quinacridone pigment component. That composition should be such that when a measuring sample comprising it is analyzed by means of high speed liquid chromatography under specific measuring conditions, the concentration of a component having a peak at the holding time of 10.3 minutes is 0.4 ppm or less.

1 Claim, 1 Drawing Sheet

OIL-BASED INK COMPOSITION FOR INK JET RECORDING AND METHOD FOR INSPECTING IT

ART FIELD

The present invention relates to an oil-based ink composition for ink jet recording and a method for inspecting it.

BACKGROUND ART

Among various ink jet recording modes known so far in the art, there are a mode of jetting ink using electrostatic induction force (electric field control mode), a mode of jetting ink using the driving pressure of a piezoelectric device (drop-on-demand mode or pressure pulse mode), and a mode of generating and growing bubbles by high heat thereby jetting ink through the resulting pressure (bubble or thermal jet mode), by which images of very high precision can be obtained.

Inks used with such ink jet recording modes generally include a water-based ink using water as a main solvent, and an oil-based ink using an organic solvent as a main solvent. Printed images obtained using the water-based ink are generally poor in water resistance, and that water-based ink renders it difficult to print images on a recording medium having a water-resistant surface. On the other hand, the oil-based ink has the merits of being capable of providing printed images excelling in water resistance, and making it easy to print images on a recording medium or wood free paper having a water-resistance surface. An oil-based ink using a pigment as a coloring material is also excellent in light fastness. Conventional oil-based inks make use of aromatic hydrocarbons such as toluene or xylene, aliphatic hydrocarbons such as hexane or kerosene, ketones such as methyl ethyl ketone, esters such as ethyl acetate, or solvents such as propylene glycol monomethyl ether acetate. Problems with such inks are, however, that their fast drying due to low boiling points or flash points are likely to clog up nozzles, and they render printer specifications costly for the reasons of their solubility and swell capability in plastics (for instance, polystyrene resin or ABS resin) used for ink storage containers, and printers or like apparatus or parts thereof. When images are printed on a polyvinyl chloride substrate, there is another problem arising about image quality and printed image dry capability.

The inventors have already come up with an oil-based ink composition for ink jet recording, which comprises polyalkylene glycol dialkyl either solvent as a main solvent and further contains a carbon black pigment, a binder resin and a dispersant so that it is fit for printing onto a polyvinyl chloride substrate. However, it has now been found that when that oil-based ink composition contains a quinacridone pigment, the stability of ink on storage become worse due to crystallization and the occurrence of deposits such as coarse particles, and there is a problem arising about the stability of ink on ink jetting.

For a conventional water-based ink composition containing a quinacridone pigment and a water-based organic solvent such as alcohols or carbitols, it has been proposed to selectively use a water-based organic solvent whose solubility in the quinacridone pigment itself is less dependent on temperature, thereby eliminating or reducing the crystallization of the pigment or the amount of deposits such as coarse particles (see Patent Publication 1). When it comes to an ink composition containing a polyalkylene glycol dialkyl ether solvent as a main solvent, however, the solubility of that solvent in the quinacridone pigment does not largely change unlike the water-mixed solvent in Patent Publication 1, although depending on the type of the solvent. In other words, it has been found that a similar inspection method as described in Patent Publication 1 cannot be used as an index to a reduction in deposits that affect the stabilities of the oil-based ink on storage and ink jetting.

Patent Publication 1

JP(A)2003-268265

SUMMARY OF THE INVENTION

The primary object of the invention is to provide an oil-based ink composition for ink jet recording, which comprises a polyalkylene glycol dialkyl ether solvent as a main solvent and further contains a quinacridone pigment, and which is improved in terms of the stabilities of ink on storage and ink jetting as well as an inspection method for an oil-based ink composition for ink jet recording, which is capable of pre-assessing how much risk there is of recrystallization and deposits such coarse particles occurring.

According to the invention, that object is achievable by the provision of an oil-based ink composition for ink jet recording, comprising as a main solvent at least a polyalkylene glycol dialkyl ether represented by the following general formula (1) and containing at least a pigment component represented by the following general formula (2), characterized in that when a measuring sample prepared by adding 2 ml of N-methyl-2-pyrrolidone and 8 ml of acetonitrile to 100 mg of said oil-based ink composition is analyzed by means of high speed liquid chromatography under the following measuring conditions, the concentration of a component having a peak at a holding time of 10.3 minutes is 0.4 ppm or less:

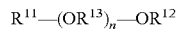

General Formula (1)

where $R^{11}$ and $R^{12}$ that may be identical with or different from one another, are each an alkyl group having 1 to 3 carbon atoms, $R^{13}$ is an ethylene or propylene group, and n is an integer of 2 to 4;

General formula (2)

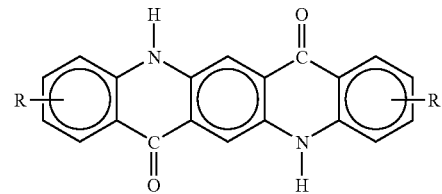

where R stands for a hydrogen atom, a methyl group or a chlorine atom; and

Measuring Conditions for High Speed Liquid Chromatography an ODS column of 4.6 mm in inner diameter and 25 cm in length is used; water (liquid A)/acetonitrile (liquid B) is used as an eluting solution at a flow rate of 1.0 ml/min. and at such a mixing ratio that there is linear gradient elution occurring, wherein the eluting solution flows at a constant 50% by volume/50% by volume (A/B) from the start of elution (0 minute) to the elapse of 1 minute, and at a rate varying from 50% by volume/50% by volume (A/B) to 0% by volume to 100% by volume (A/B) from the elapse of 1 minute after the start of elution to the elapse of 25 minutes; the column temperature is at 40° C.; and the detection wavelength is at 254 nm±4 nm.

The aforesaid oil-based ink composition for ink jet recording is also characterized by further containing a lactone solvent, a binder resin and a dispersant.

The present invention also provides an inspection method for an oil-based ink composition for ink jet recording, which comprises as a main solvent at least a polyalkylene glycol dialkyl ether represented by the aforesaid general formula (1) and as a composition component at least a pigment component represented by the aforesaid general formula (2), characterized in that said oil-based ink composition is assessed as applicable to ink jet recording when, in analyzing a measuring sample prepared by adding 2 ml of N-methyl-2-pyrrolidone and 8 ml of acetonitrile to 100 mg of said oil-based ink composition by means of high speed liquid chromatography under the aforesaid measuring conditions, the concentration of a component having a peak at a holding time of 10.3 minutes is 0.4 ppm or less.

BRIEF DESCRIPTION OF THE DRAWING

The purposes and advantages of the invention will be apparent from the following detailed description in conjunction with the appended single drawing.

BEST MODE OF CARRYING OUT THE INVENTION

Figure 1:
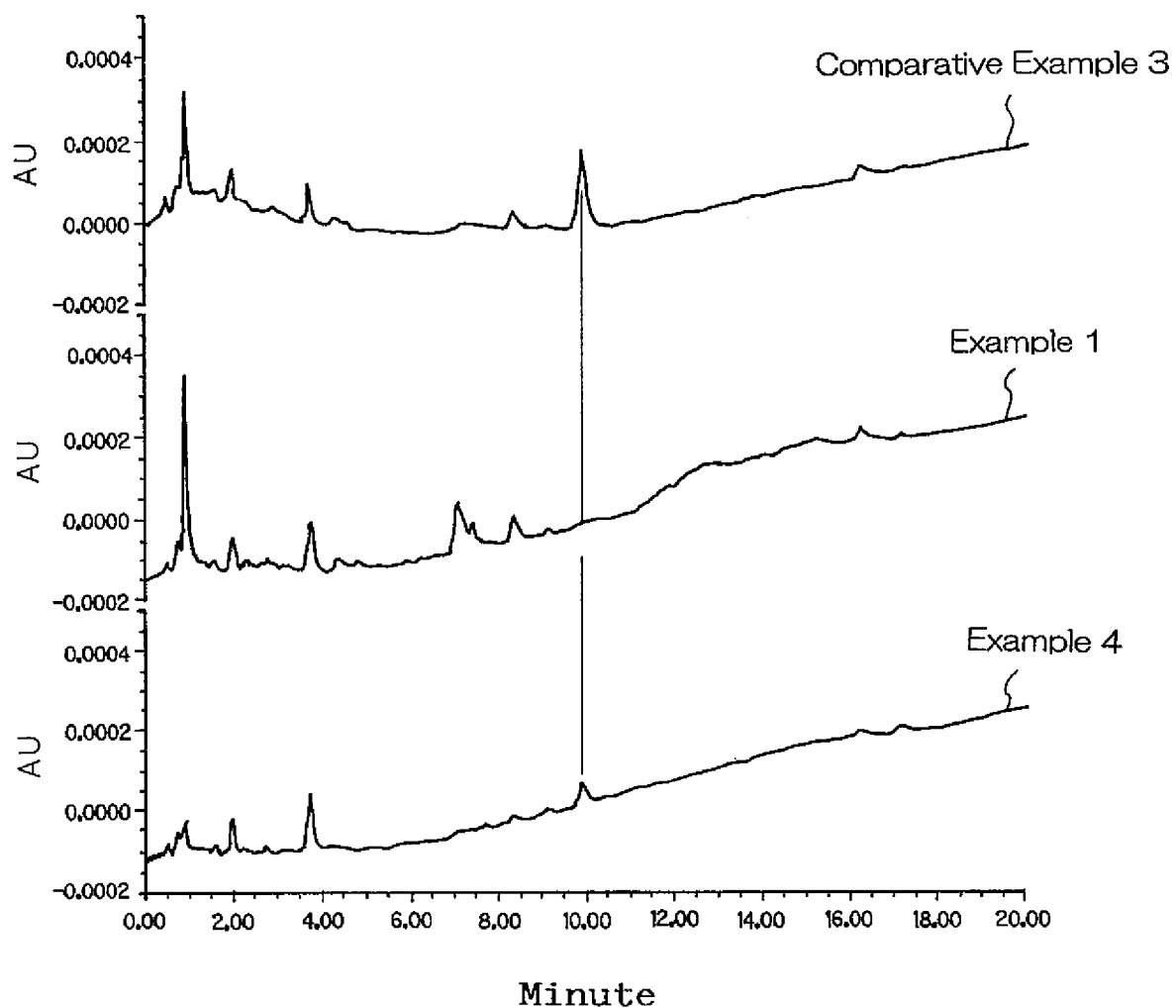
FIG. 1 is indicative of chromatograms for the oil-based ink compositions for ink jet recording as obtained in Examples 1 and 4 as well as Comparative Example 3.

The composition of the oil-based ink composition for ink jet recording according to the invention is now explained.

The solvent in the oil-based ink composition comprises as its main solvent the polyalkylene glycol dialkyl ether having the aforesaid general formula (1). The polyalkylene glycol dialkyl ether having the aforesaid general formula (1) has a boiling point of 150° C. or higher, and preferably 180° C. or higher under atmospheric pressure. Although there is no upper limit provided to the boiling point, yet it is preferable that the ether has a prime facie upper limit boiling point of about 240° C. in view of the ink jetting recording function or the ether has to have a high boiling point and a low vapor pressure and be improved in terms of work-site safety as well. The ether according to the invention has also a density of 0.9 g/cm$^3$ to 1.0 g/cm$^3$ at 20° C.

The polyalkylene glycol dialkyl ether here, for instance, includes diethylene glycol dimethyl ether, triethylene glycol dimethyl ether, tetraethylene glycol dimethyl ether, diethylene glycol diethyl ether, triethylene glycol diethyl ether, tetraethylene glycol diethyl ether, diethylene glycol ethyl methyl ether, triethylene glycol ethyl methyl ether, tetraethylene glycol methyl methyl ether, diethylene glycol-di-n-propyl ether and diethylene glycol-di-iso-propyl ether, among which preference is given to diethylene glycol diethyl ether, triethylene glycol dimethyl ether and diethylene glycol ethyl methyl ether.

For the solvent component it is preferable to use a lactone solvent in combination with the main solvent. The lactone solvent is a compound having a ring structure by way of an ester bond, including, for instance, γ-lactone having a five-membered ring structure, δ-lacton having a six-membered ring structure, and ε-lactone having a seven-membered ring structure. More specifically, there is the mention of γ-butyrolactone, γ-valerolactone, γ-hexylactone, γ-heptalactone, γ-octalacctone, γ-nonalactone, γ-decalactone, γ-undecalactone, δ-valerolactone, δ-hexylactone, δ-heptalactone, δ-octalacctone, δ-nonalactone, δ-decalactone, δ-undecalactone, and ε-caprolactam.

In a preferable embodiment of the invention, the lactone solvent is γ-lactone having a five-membered ring structure, and in a more preferable embodiment, the lactone solvent is γ-butyrolactone, and γ-valerolactone.

Referring here to the proportion of the ether and lactone solvents, it is preferable that the lactone solvent is used in an amount of 0.02 to 4 parts by mass, especially 0.05 to 2 parts by mass per 1 part by mass of the polyoxyethylene glycol dialkyl ether having the general formula (1). The ether and lactone solvents are preferably contained in the oil-based ink composition in an amount of at least 50% by mass, and preferably at least 70% by mass. This ensures the improved ability of the ink to penetrate through a polyvinyl chloride substrate, the improved leveling capability, and the improved image drying capability.

Reference is then made to the component that is to be dispersed or dissolved in the aforesaid ether and lactone solvents in the oil-based ink composition for ink jet recording.

The coloring material here is a quinacridone pigment having the aforesaid general formula (2). The primary particles of the pigment have a volume-average particle diameter of 50 to 500 nm, and preferably 50 to 200 nm. The content of the pigment is 0.5 to 25% by mass, preferably 0.5 to 15% by mass, and more preferably 1 to 10% by mass in the oil-based ink composition.

A variety of quinacridone pigments are now on the market. However, it has now been found that although depending on the makers and production lots of such quinacridone pigments, there are deposits whose solubility in the solvents of the invention depends on temperature, and a coarsening of such deposits has adverse influences on the stabilities of ink on storage and ink jetting. In consideration of the fact that the deposits differ depending on the makers and production lots of quinacridone pigments, the quinacridone pigment used is going to contain a component of raw materials or the like in the production process. This component whose solubility depends on temperature could possibly cause deposits to occur due to recrystallization and coarsening.

Details of the deposits have yet to be clarified. From the results of high speed liquid chromatography (HPLC) of collected deposits, however, the inventors have now found that there is a chromatogram obtained having a peak at the holding time of around 10.3 minutes alone, and that the component having a peak at the holding time of 10.3 minutes matches with those deposits. FIG. 1 is indicative of chromatograms for the oil-based ink compositions for ink jet recording obtained in Examples 1 and 4 as well as Comparative Example 3. In Examples 1 and 4 and Comparative Example 3, the concentration of the component having a peak at the holding time of 10.3 minutes is found to be 0.08 ppm, 0.36 ppm, and 1.40 ppm, respectively. It is noted that FIG. 1 has peak strength (AU) as ordinate. If deposits are collected to prepare compositions of varying concentrations and they are likewise analyzed by means of HPCL to make analytical curves, it is then possible to calculate strength as concentration using those analytical curves. Although where peaks at holding times except 10.3 minutes in FIG. 1 assign to still remain unclear, there could be no correlation to the deposits in view of the chromatogram of the deposits alone.

The consideration of the examples given later teaches that an oil-based ink composition wherein the concentration of the component having a peak at the holding time of 10.3 minutes is 0.4 ppm or less can provide an oil-based ink composition for ink jet recording that can be much more improved in terms of stability on storage and ink jetting, because of being free of any coarse particles. The present invention also provides a method for the inspection of an oil-based ink composition for ink jet recording that can pre-assess it about how much risk there is of recrystallization and a coarsening of particles. It is here noted that the detectable lowest concentration (detection sensitivity) of the component having a peak at the holding time of 10.3 minutes is 0.05 ppm.

Besides the quinacridone pigment, the oil-based ink composition for ink jet printing according to the invention further contains a binder resin and a dispersant optionally in a dispersed or dissolved state.

The binder resin here is soluble in the organic solvent such as the polyalkylene glycol dialkyl ether, and added to the oil-based ink composition for the purpose of controlling its viscosity and the ability of ink to be fixed to a polyvinyl chloride substrate. The binder resin, for instance, includes acrylic resin, styrene-acrylic resin, rosin-modified resin, phenolic resin, terpene resin, polyester resin, polyamide resin, epoxy resin, vinyl chloride-vinyl acetate copolymer resin, cellulosic resin such as cellulose acetate butyrate, and vinyl-toluene-α-methylstyrene copolymer, which may be used alone or in admixture.

The content of the binder resin is 0.5 to 10 times, and preferably 0.75 to 7 times as much as the content of the quinacridone pigment (on weight basis).

For the dispersant, use may be made of any desired dispersant employed with ordinary oil-based ink compositions, especially with oil-based ink compositions for ink jet recording. Preference is given to a polymer dispersant comprises as a main chain a polyester chain, a polyacrylic chain, a polyurethane chain or a polyamine chain and as a side chain a polar group such as an amino group, a carboxyl group, sulfone group or hydroxyl group, and a polyester-based polymer dispersant is particularly preferred. For the dispersant, it is preferable to use a dispersant that takes effect when the solubility parameter of the organic solvent is in the range of 8 to 11.

For such dispersants, commercially available ones may be used. Specific examples are polyester-based polymer compounds such as Hinoact Series KF1-M, T-6000, T-7000, T-8000, T-8350P, and T8000EL (made by Takefu Fine Chemical Co., Ltd.); Solsperse Series 20000, 24000, 32000, 32500, 33500, 34000, and 35200 (Lubrizol Corporation.); Disperbyk Series 161, 162, 163, 164, 166, 180, 190, 191 and 192 (made by BYK Chemie Co., Ltd.); Flowlen DOPA Series 17, 22, 33, and G-700 (Kyoei Chemical Co., Ltd.); Ajispar Series PB821, and PB711 (made by Ajinomoto Fine Techno Co., Ltd.); and LP Series 4010, LP4050, LP4055, POLYMER Series 400, 401, 402, 403, 450, 451, and 453 (Efka Chemicals Co., Ltd.), which may be used alone or in admixture.

The content of the dispersant(s) in the oil-based ink composition of the invention is 5 to 200% by mass, and preferably 30 to 120% by mass relative to the content of the quinacridone pigment.

The oil-based ink composition of the invention may additionally contain antioxidants, ultraviolet absorbers, and surfactants. A typical antioxidant is BHA (2,3-butyl-4-hydroxyanisole), and BHT (2,6-di-t-butyl-p-cresol), and added to the oil-based ink composition in an amount of 0.01 to 3.0% by mass. A typical ultraviolet absorber is a benzophenone or benzotriazole compound, and added to the oil-based ink composition in an amount of 0.01 to 0.5% by mass. The surfactant used may be any of anionic, cationic, amphoteric or nonionic ones, and is added to the oil-based ink composition in an amount of 0.5 to 4.0% by mass.

If required or optionally, additives such as plasticizers, anti-static agents, viscosity modifiers and defoaming agents may be added to the oil-based ink composition for ink jet recording according to the invention.

The oil-based ink composition for ink jet recording according to the invention may be prepared or otherwise formulated by adding the quinacridone pigment and dispersant to a part of the organic solvent such as the polyalkylene glycol dialkyl ether, and then mixing and dispersing them by means of ball mills, bead mills, ultrasonic waves, jet mills or the like to prepare a pigment dispersion. Then, the rest of the aforesaid solvent, the binder resin and other additives are added under agitation to the obtained pigment dispersion.

The thus obtained oil-based ink composition for ink jet recording is adjusted in such a way as to have a viscosity of 2 to 10 mPa·s, and preferably 3 to 5 mPa·s, as measured at 20° C.

The oil-based ink composition of the invention has preferably a surface tension of 20 to 50 mN/m. As the surface tension falls short of 20 mN/m, it will often cause the ink composition to spread over the surface of the head of a printer for ink jet recording, or ooze out, rendering the jetting of ink droplets difficult. As the surface tension exceeds 50 mN/m, it will often result in the inability of the ink composition to spread over the surface of a recording medium, rendering satisfactory printing impossible.

For instance, the oil-based ink composition of the invention, because of having the merit of being inert to the surface of an ink-repellent jet nozzle, is favorably used with an ink jet recording process wherein ink is jetted from a printer head for ink jet recording that has an ink-repellent jet nozzle surface.

The oil-based ink composition for ink jet recording according to the invention is preferably applicable to a recording medium comprising a plastic substrate, especially a hard or soft polyvinyl chloride substrate exemplified by a polyvinyl chloride film or sheet. With the oil-based ink composition for ink jet printing, it is possible to apply printing to an unprocessed surface of the polyvinyl chloride substrate and, hence, dispense with any costly recording medium like a conventional recording medium having an ink receiving layer, although it may be applied to an application surface treated by an ink receiving resin.

EXAMPLE

By way of example but not by way of limitation, the present invention is now explained with reference to specific examples.

It is noted that viscosity was measured with a viscometer "AMVn" made by Anton Paar Co., Ltd, and the particle diameter of pigment particles was measured with "MicroTrack UPA150" made by Nikkiso Co., Ltd.

Inventive and Comparative Examples

Seven commercial quinacridone pigments (C.I. Pigment Red 122) wherein the R in the general formula (2) was a methyl group, varying in makers and production lots, were readied up for experimentation.

To a part of the solvent composed of 7.25 parts by mass of Diethylene glycol diethyl ether and 20 parts by mass of γ-butyrolactone, 3 parts by mass of one of the aforesaid pigments (C.I. Pigment Red 122) and 1.5 parts by mass of a dispersant ("Solsperse 32000" made by Lubrizol Corporation) were added for one hour stirring at 3,000 rpm in a dissolver, followed by pre-dispersion in a bead mill charged with zirconia beads (2 mm). The obtained pigment particles had an average particle diameter of 5 μm or less. Further, dispersion was carried out with a nano-mill charged with zirconia beads (0.3 mm) to obtain a pigment dispersion found to have an average pigment particle diameter of 150 nm.

Under stirring at 4,000 rpm, 3 parts by weight of a binder resin ("Paraloid B60" made by Rohm and Haas Co., Ltd.) and the rest of the aforesaid solvent were added to the obtained pigment dispersion to prepare an oil-based ink composition for ink jet recording. The viscosity of the composition is set out in Tables 1 and 2.

The remaining six of the aforesaid C.I. Pigment Red 122 were similarly formulated into oil-based ink compositions for ink jet recording. The viscosities of the respective compositions are again set out in Tables 1 and 2.

HPLC (Preparation of the Measuring Sample)

One hundred (100) mg of each oil-based ink composition are placed in a 30 ml vial bottle, and 2 ml of N-methyl-2-pyrrolidone are added to and mixed with the composition, to which 8 ml of acetonitrile are further added. The obtained solution is filtered through a 45-μm hydrophilic PTFE membrane filter Milleex-LH (Nippon Millipore Co. Ltd.). Five (5) μl of the filtrate were collected to obtain a measuring sample.

(Measuring Conditions)

An HPLC analyzer (2695/2996 made by Nippon Waters Co., Ltd.) and an ODS column for HPLC (Supelco sil LC-18 DB Column of 4.6 mm in inner diameter and 25 cm in length made by Supelco Co., Ltd.) were used with an eluting solution of water (liquid A)/acetonitrile (liquid B) at a flow rate of 1.0 ml/min. Linear gradient elution was carried out such that the mixing ratio of the eluting solution was kept at a constant 50% by volume/50% by volume (A/B) from the start of elution (0 minute) to the elapse of one minute, and varied from 50% by volume/50% by volume (A/B) to 0% by volume to 100% by volume (A/B) from the elapse of one minute after the start of elution to the elapse of 25 minutes. Measurement was done at a column temperature of 40° C. and a detection wavelength of 254 nm±4 nm.

As the ODS column here, Supelco sil LC-18 DB column (made by Spelco Co., Ltd.) was used; in the invention, however, any of commercial ODS columns, for instance, Develosil ODS-HG (made by Nomura Chemical Co., Ltd.), may preferably be used.

FIG. 1 is indicative of the chromatograms for the oil-based ink compositions obtained in Examples 1 and 4 as well as Comparative Example 3.

Using the chromatogram obtained using each oil-based ink composition and separately created analytical curves (not shown), the concentration of the component having a peak at the holding time of 10.3 minutes was found. The results are set out in the form of detected concentrations (ppm) in Tables 1 and 2.

(Stability on Storage (1μ Foreign Matters))

Each oil-based ink composition was placed in a polypropylene sample vessel that was then tightly lidded up. In this state, the composition was let stand alone in a room temperature environment for one week, after which it was filtered through a 1μ glass filter to observe 1μ foreign matters. The results are set out in the "stability on storage (1μ foreign matters)" in Tables 1 and 2.

(Stability on Storage (Coarse Particles))

After heated to 90° C. or higher, each oil-based ink composition was let stand alone and cooled off in a room temperature environment. By giving such hysteresis to the oil-based ink composition, a lot more dissoluble component was dissolved to accelerate recrystallization. This is to assess the risk of deposition more rapidly than at room temperature.

After let stand alone, the oil-based ink composition was filtered through a 1μ glass filter to observe coarse foreign matters of 5μ or greater. The results are set out in the "stability on storage (coarse particles)" in Tables 1 and 2.

(Stability on Jetting)

Each oil-based ink composition was loaded in an ink jet printer (MJ-8000C made by Seiko Epson Corporation) to apply continued printing to a polyvinyl chloride film (Viewcal made by Lintec Co., Ltd.) for the purpose of observing the occurrence of foreign matters in the printer. The results are set out in the "stability on jetting" in Tables 1 and 2.

TABLE 1

|  | Ex. 1 | Ex. 2 | Ex. 3 | Ex. 4 |
| --- | --- | --- | --- | --- |
| Viscosity of the composition (mPa · s (20° C.)) | 4.1 | 4.0 | 4.2 | 4.0 |
| Detected concentration (ppm) | 0.08 | 0.12 | 0.25 | 0.36 |
| Stability on storage | | | | |
| 1μ foreign matters | none | none | none | none |
| Coarse particles | none | none | none | none |
| Stability on jetting | | | | |
| Foreign matters in the Printer | none | none | none | none |

TABLE 2

| Comparative Example | 1 | 2 | 3 |
| --- | --- | --- | --- |
| Viscosity of the composition (mPa · s (20° C.)) | 4.2 | 4.1 | 3.9 |
| Detected concentration (ppm) | 0.50 | 0.88 | 1.40 |
| Stability on storage | | | |
| 1μ foreign matters | found | found | found |
| Coarse particles | found | found | found |
| Stability on jetting | | | |
| Foreign matters in the Printer | found | found | found |

The maker, trade name and production lot nos. of the quinacridone used in Examples 1-4 and Comparative Examples 1-3 in Tables 1 and 2 are as follows:

Example 1: FASTGEN SUPER MAGENTA RG made by DIC with production lot no. 28818.

Example 2: FASTGEN SUPER MAGENTA RG made by DIC with production lot no. 28865.

Example 3: FASTGEN SUPER MAGENTA RG made by DIC with production lot no. 29468.

Example 4: FASTGEN SUPER MAGENTA RG made by DIC with production lot no. 29546.

Comparative Example 1: FASTGEN SUPER MAGENTA RG made by DIC with production lot no. 29308.

Comparative Example 2: FASTGEN SUPER MAGENTA RG made by DIC with production lot no. 92367.

Comparative Example 3: FASTGEN SUPER MAGENTA RG made by DIC with production lot no. 92400.

From Tables 1 and 2, it is appreciated that as long as the detected concentration remains 0.4 ppm or less, both the stability on storage and the stability on jetting are improved. It is also found that whenever there is an oil-based ink composition having a detected concentration exceeding 0.4 ppm can be assessed as being not applied to ink jet recording, and the invention provides a favorable method for the inspection of oil-based ink compositions for ink jet recording.

The oil-based ink composition for ink jet recording according to the invention is best suited for printing onto polyvinyl chloride substrates, and is more improved than ever in terms of stability of ink on storage and jetting.

What we claim is:

1. A method for inspecting an oil-based ink composition for ink jet recording, which assesses whether or not an oil-based ink composition that is obtained by dispersing at least a pigment component represented by the following general formula (2) in a mixed solvent comprising 0.02 to 4 parts by mass of a lactone solvent per 1 part by mass of a polyalkylene glycol dialkyi ether represented by the following general formula (1) is suitable for ink jet recording, characterized in that said oil-based ink composition is assessed as applicable to ink jet recording when, in analyzing a measuring sample prepared by adding 2 ml of N-methyl-2-pyrrolidone and 8 ml of acetonitrile to 100 mg of said oil-based ink composition by means of high speed liquid chromatography under the following measuring conditions, the concentration of a component having a peak at a holding time of 10.3 minutes is 0.4 ppm or less:

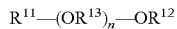　　　　　　　General Formula (1)

$R^{11}$—$(OR^{13})_n$—$OR^{12}$ where $R^{11}$ and $R^{12}$ that may be identical with or different from one another, are each an alkyl group having 1 to 3 carbon atoms, $R^{13}$ is an ethylene or propylene group, and n is an integer of 2 to 4;

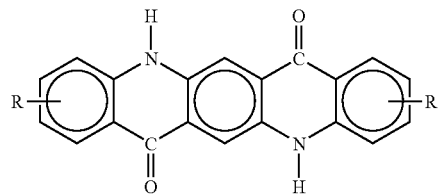

General formula (2)

where R stands for a hydrogen atom, a methyl group or a chlorine atom; and

Measuring Conditions for High Speed Liquid Chromatography an ODS column of 4.6 mm in inner diameter and 25 cm in length is used; water (liquid A)/acetonitrile (liquid B) is used as an eluting solution at a flow rate of 1.0 ml/min and at such a mixing ratio that there is linear gradient elution occurring, wherein the eluting solution flows at a constant 50% by volume/50% by volume (A/B) from the start of elution (0 minute) to the elapse of 1 minute, and at a rate varying from 50% by volume/50% by volume (A/B) to 0% by volume to 100% by volume (A/B) from the elapse of 1 minute after the start of elution to the elapse of 25 minutes; the column temperature is at 40° C.; and the detection wavelength is at 254 nm±4 nm.

* * * * *